United States Patent
Lin et al.

(10) Patent No.: US 8,571,497 B1
(45) Date of Patent: Oct. 29, 2013

(54) CLOSED-LOOP POWER CONTROL IN CONJUNCTION WITH ADAPTIVE POWER AMPLIFIER LINEARIZATION

(75) Inventors: Li Lin, Saratoga, CA (US); Arnab Kumar Mitra, Sunnyvale, CA (US); Daxiao Yu, Cupertino, CA (US); Harish Ramamurthy, Sunnyvale, CA (US); Sergey Timofeev, Santa Clara, CA (US); Lance Nagamine, Fremont, CA (US); Brian Bosso, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 61 days.

(21) Appl. No.: 13/297,420

(22) Filed: Nov. 16, 2011

Related U.S. Application Data

(60) Provisional application No. 61/415,783, filed on Nov. 19, 2010, provisional application No. 61/416,163, filed on Nov. 22, 2010.

(51) Int. Cl.
*H01Q 11/12* (2006.01)
*H04B 1/04* (2006.01)

(52) U.S. Cl.
USPC .......... 455/127.2; 455/118; 455/126

(58) Field of Classification Search
USPC .......... 455/118, 125, 126, 127.1, 127.2
See application file for complete search history.

(56) References Cited

U.S. PATENT DOCUMENTS

| | | |
|---|---|---|
| 2005/0059424 A1* | 3/2005 | Sahota .......... 455/522 |
| 2005/0159116 A1* | 7/2005 | Xiong .......... 455/127.1 |

* cited by examiner

*Primary Examiner* — Nhan Le

(57) ABSTRACT

A radio frequency transmitting system includes a programmable amplifier, a power amplifier, a power detector, and a calibration module. The programmable amplifier is configured to amplify an input signal to generate an amplified signal. The power amplifier is configured to output a transmit signal in response to the amplified signal. The transmit signal has a transmit power. The power detector is configured to generate a power measurement in response to the transmit power. The calibration module is configured to implement a plurality of feedback loops to adjust a gain of the programmable amplifier in response to a difference between the power measurement and a desired transmit power. The calibration module is configured to select one of the plurality of feedback loops in response to the desired transmit power.

16 Claims, 19 Drawing Sheets

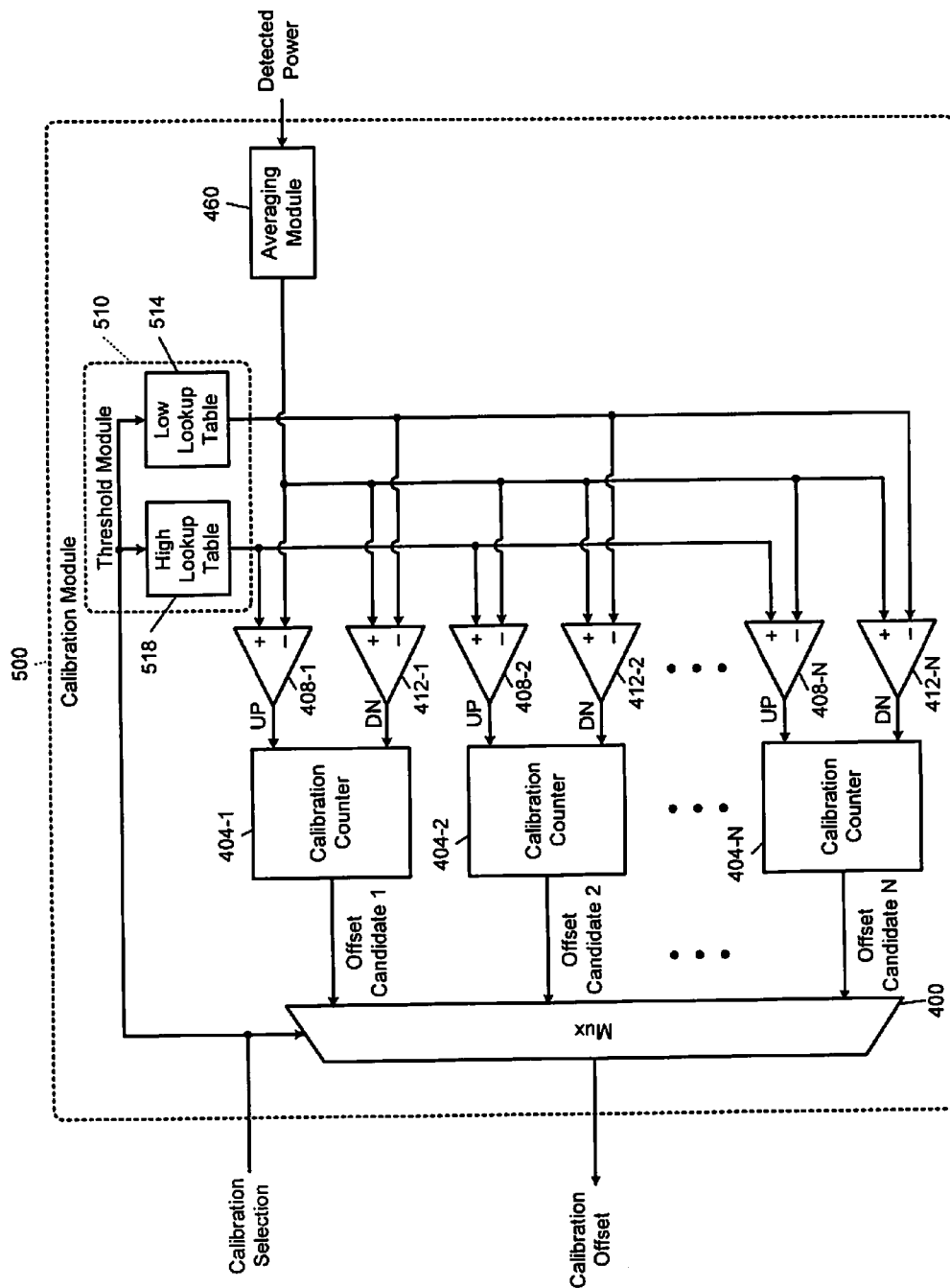

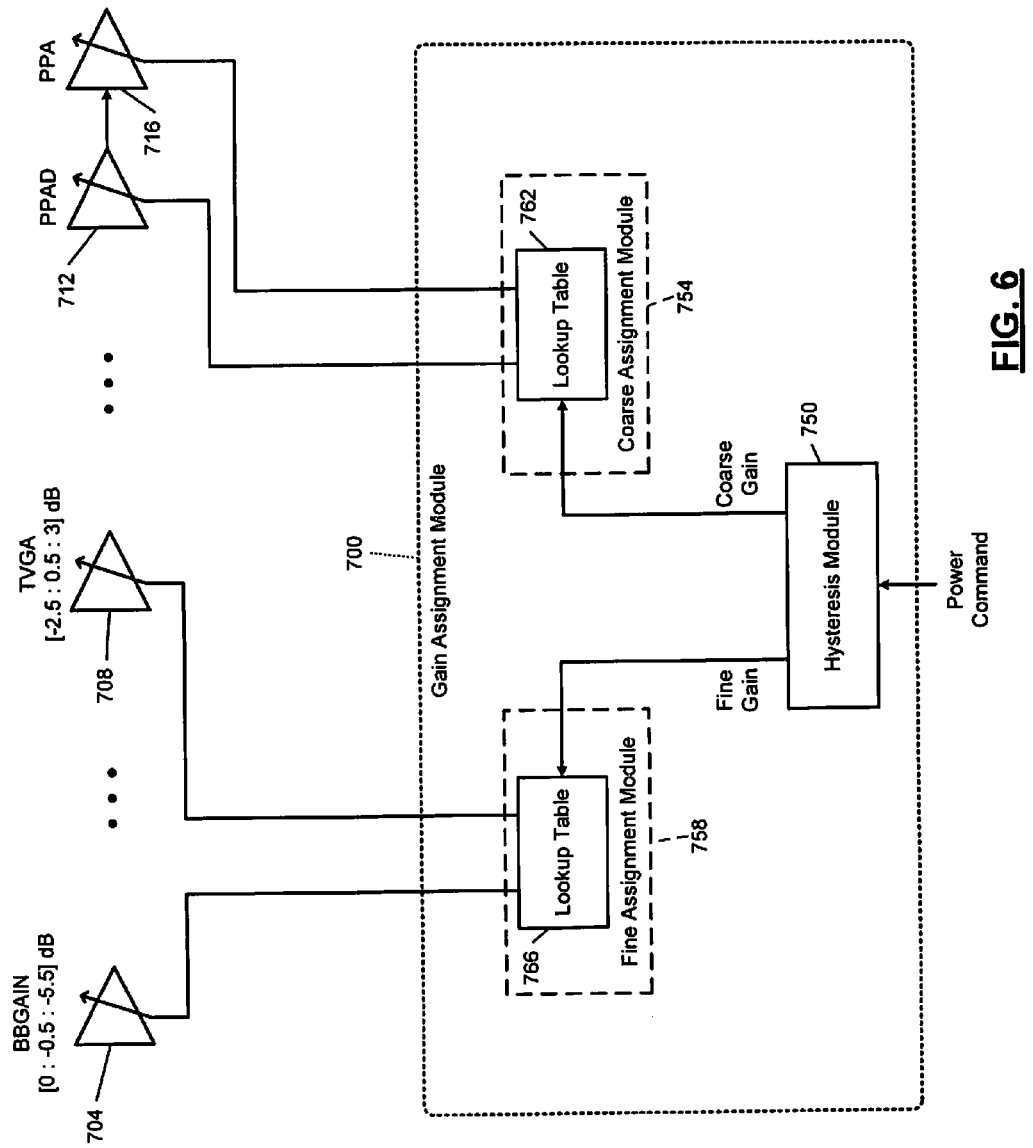

CLOSED-LOOP POWER CONTROL IN CONJUNCTION WITH ADAPTIVE POWER AMPLIFIER LINEARIZATION

CROSS-REFERENCE TO RELATED APPLICATIONS

This application claims the benefit of U.S. Provisional Application No. 61/415,783, filed on Nov. 19, 2010, and U.S. Provisional Application No. 61/416,163, filed on Nov. 22, 2010. The disclosures of the above applications are incorporated herein by reference in their entirety.

FIELD

The present disclosure relates to radio frequency power amplification and more particularly to closed-loop power control in conjunction with adaptive power amplifier linearization.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a wireless radio frequency transmission system is shown. A baseband module 100 generates baseband signals in response to data for wireless transmission. The baseband signals are provided to a baseband amplifier 104, which digitally amplifies the baseband signals. A digital-to-analog converter (DAC) 108 receives the amplified digital signals and generates analog signals.

The analog signals are amplified by a transmission amplifier 112. A low-pass filter 116 removes high frequencies from the amplified signal and provides the result to a mixer 120. The mixer 120 mixes the analog signal with an oscillating signal to convert the filtered signal from baseband to a radio frequency band. A power amplifier driver 124 amplifies the up-converted signal, which is further amplified by a power amplifier 128 and a power amplifier 132. The results of these amplification stages are radiated by an antenna 136. The radiated signal is then received by a radio frequency receiver, thereby wirelessly communicating data.

SUMMARY

A radio frequency transmitting system includes a programmable amplifier, a power amplifier, a power detector, and a calibration module. The programmable amplifier is configured to amplify an input signal to generate an amplified signal. The power amplifier is configured to output a transmit signal in response to the amplified signal. The transmit signal has a transmit power. The power detector is configured to generate a power measurement in response to the transmit power. The calibration module is configured to implement a plurality of feedback loops to adjust a gain of the programmable amplifier in response to a difference between the power measurement and a desired transmit power. The calibration module is configured to select one of the plurality of feedback loops in response to the desired transmit power.

A method of operating a radio frequency transmitting system includes, using a programmable amplifier, amplifying an input signal to generate an amplified signal. The method also includes, using a power amplifier, outputting a transmit signal in response to the amplified signal. The transmit signal has a transmit power. The method also includes generating a power measurement in response to the transmit power. The method also includes implementing a plurality of feedback loops to adjust a gain of the programmable amplifier in response to a difference between the power measurement and a desired transmit power. The method also includes selecting one of the plurality of feedback loops in response to the desired transmit power.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIGS. 3A-3H are functional block diagrams of example calibration modules;

FIG. 6 is a functional block diagram of an example implementation of a gain assignment module;

DESCRIPTION

In radio frequency (RF) transmission systems, a target power for transmission may be set based on factors such as distance to a receiver, interference, and measured error rate. In order to ensure that the target power is actually being produced, a power detector may monitor the power being transmitted and provide the measured value to a closed-loop system. The closed-loop system applies a corrective input to reduce the difference between the target power and the actual power being transmitted.

When transitioning from one target power to another target power, the closed-loop control takes time to stabilize. This settling time may be reduced by using different feedback loops for each power target. When switching from one power target to another, a feedback loop that corresponds to the new power target can be selected, which reduces settling time.

Figure 1:
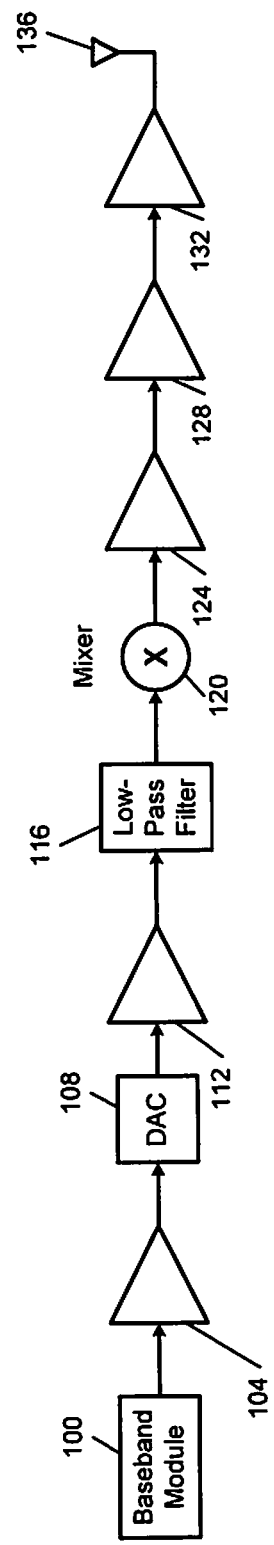
FIG. 1 is a radio frequency transmitter according to the prior art.
Figure 2A:
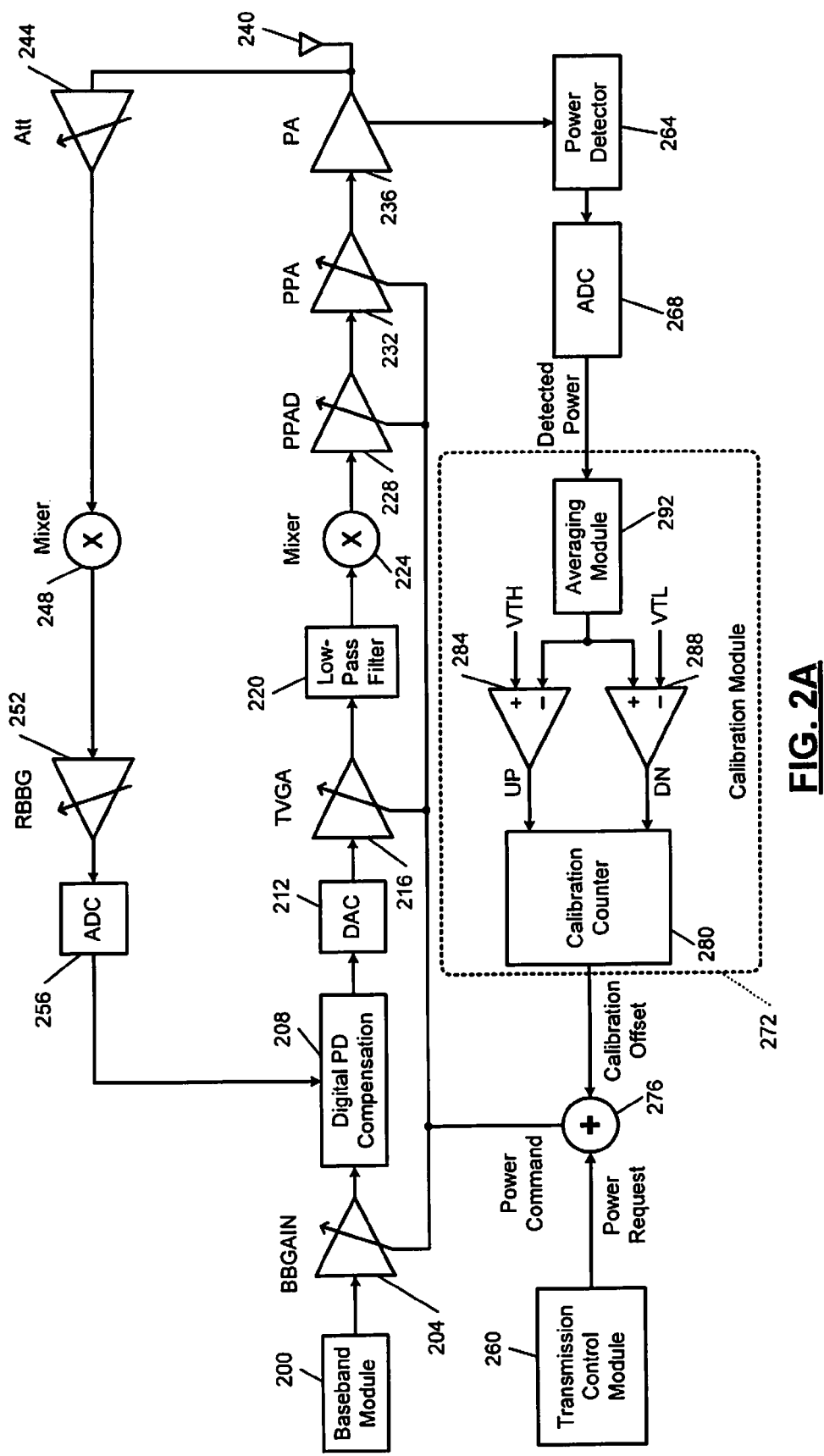
FIG. 2A is a functional block diagram of an example radio frequency transmitter.
Figure 2B:
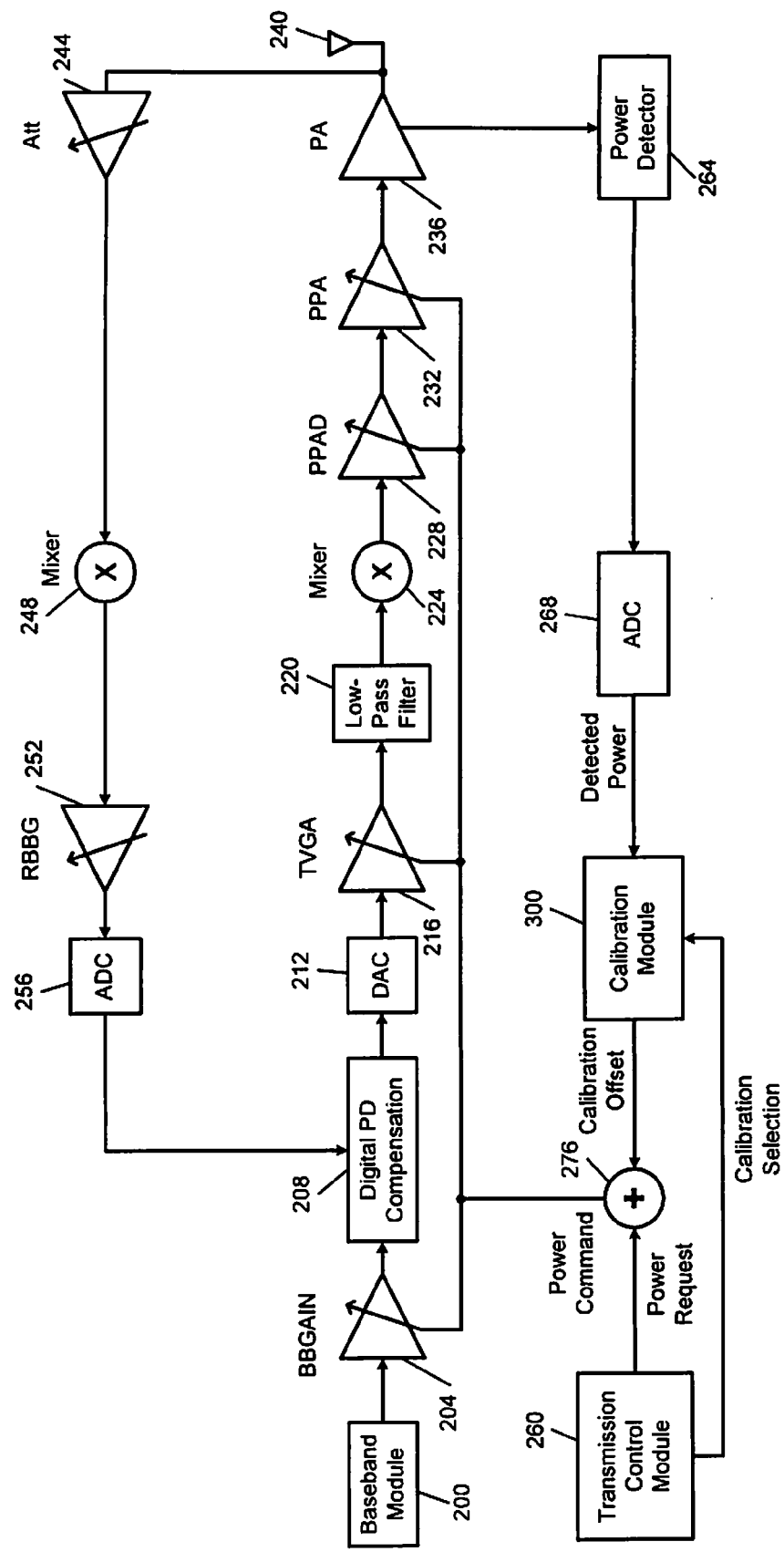
FIG. 2B is a functional block diagram of an example radio frequency transmitter implementing an adjustable calibration module.
Figure 2C:
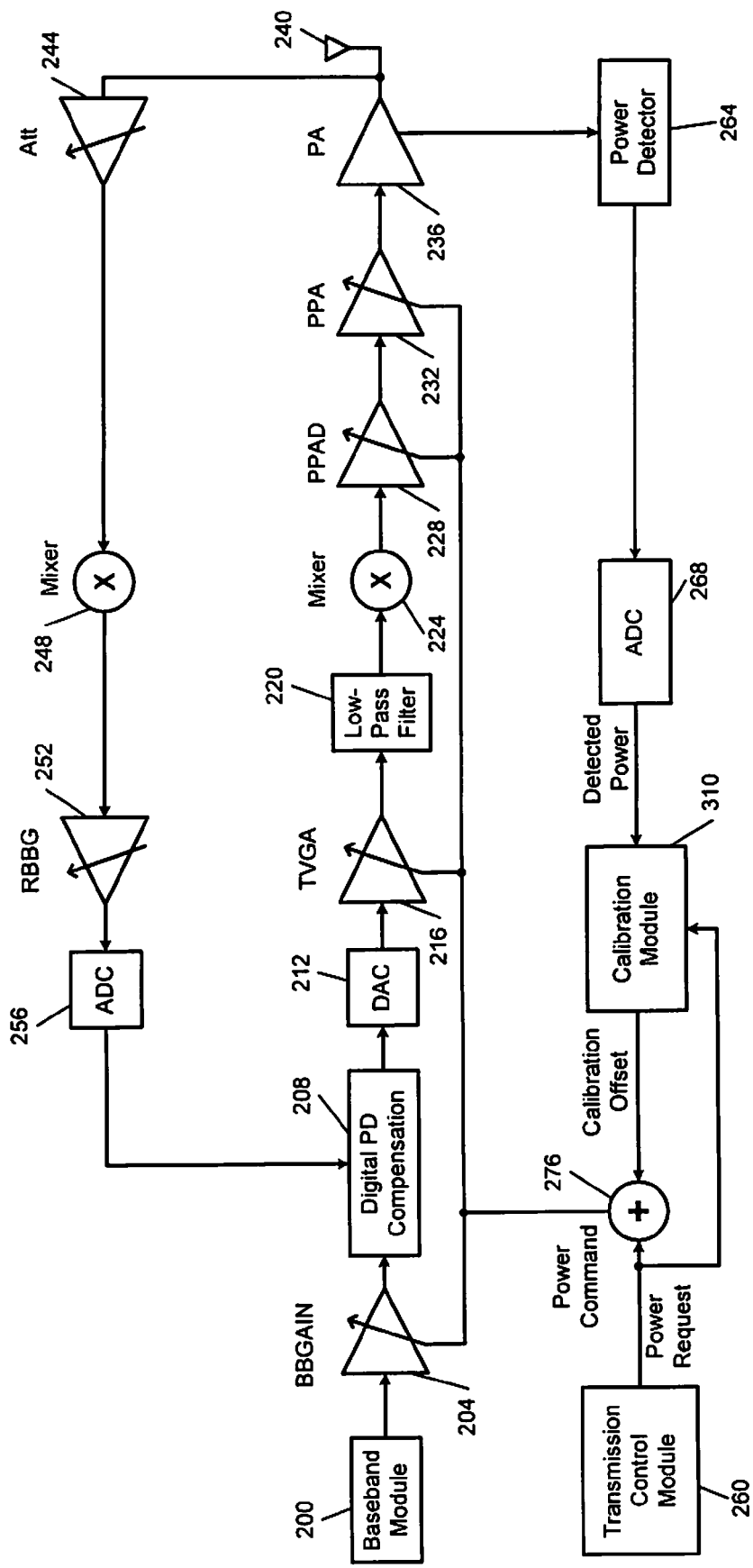
FIG. 2C is a functional block diagram of an example radio frequency transmitter where the calibration module receives a power request.
Figure 8:
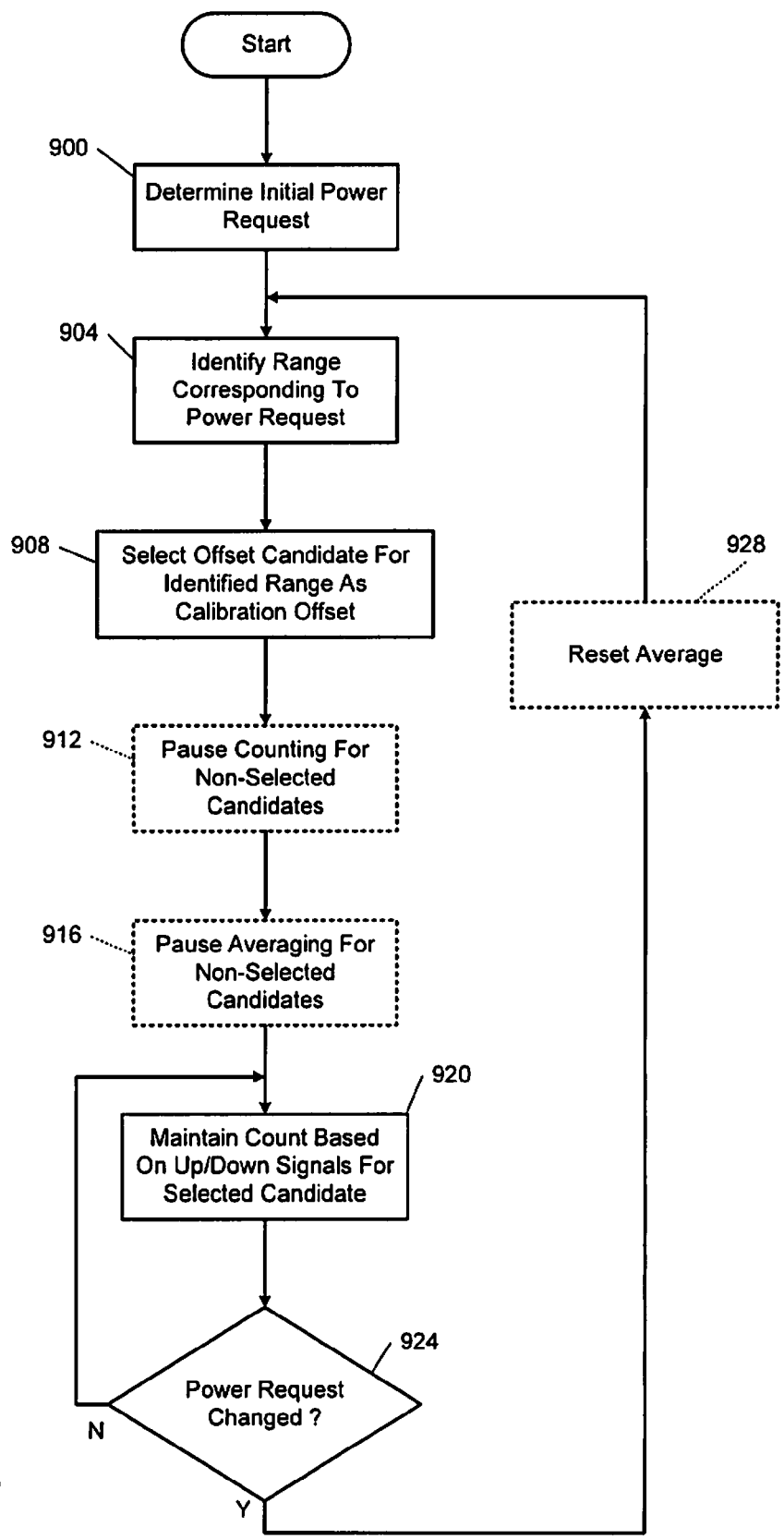
FIG. 8 is a flowchart depicting example operation of a calibration module according to the principles of the present disclosure.

For a discrete number of power targets, there may be one feedback loop for each power target. Alternatively, a single feedback loop may be used for multiple power targets or for a range of power targets. A single feedback loop is shown in FIG. 2A, while systems with multiple feedback loops are shown in FIGS. 2B-2C. Examples of calibration modules that implement multiple feedback loops are shown in FIGS. 3A-3H. An example method for selecting a feedback loop is shown in FIG. 8.

In addition to closed-loop power control, power amplifier output linearization may also be performed. For example, an output signal of a transmit power amplifier may be measured and mixed down to baseband. This baseband measurement is compared with the desired baseband signal and a predistortion correction is applied to the baseband signal so that the output of the transmit power amplifier matches the desired baseband signal.

The characteristics (such as frequency and time domain response) of the transmit system may change as gain is changed, so when a coarse change is made to the gain, the previous predistortion correction may no longer apply. As the predistortion correction is being updated based on the new transmit characteristics exhibited in the transmit output signal, the transmitted signal will have greater distortion. Therefore, after a step change in gain, the linearity of the transmitted signal is diminished.

Figure 4:
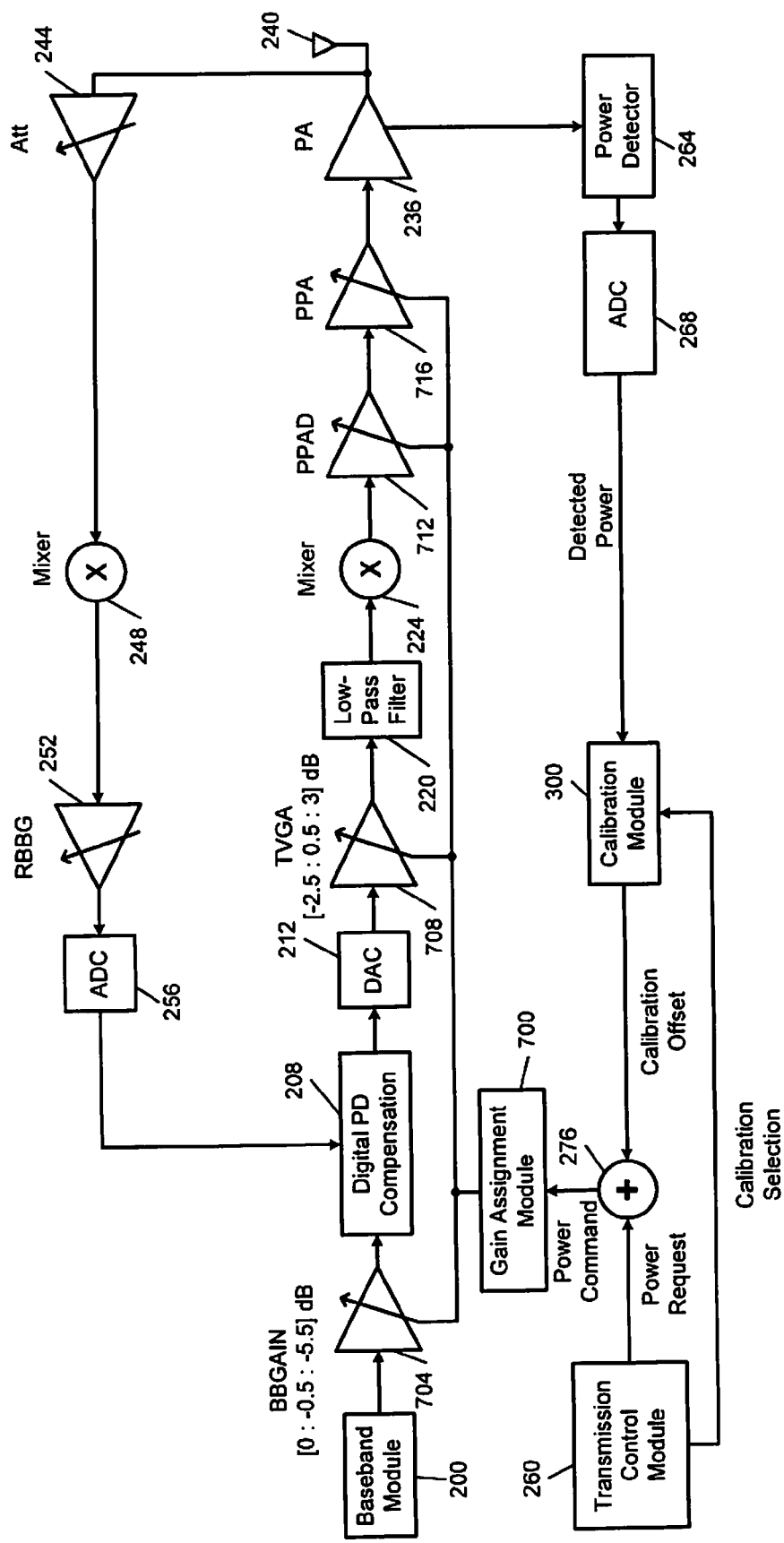
FIG. 4 is a functional block diagram of an example radio frequency transmitter implementing gain control hysteresis.
Figure 5A:
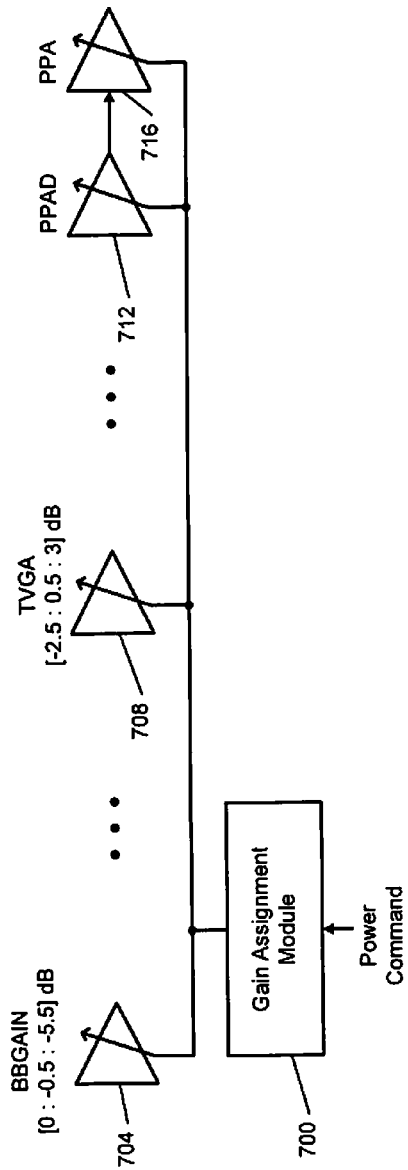
FIGS. 5A-5B are functional block diagrams of communication between a gain assignment module and amplifiers having adjustable gains.
Figure 5B:
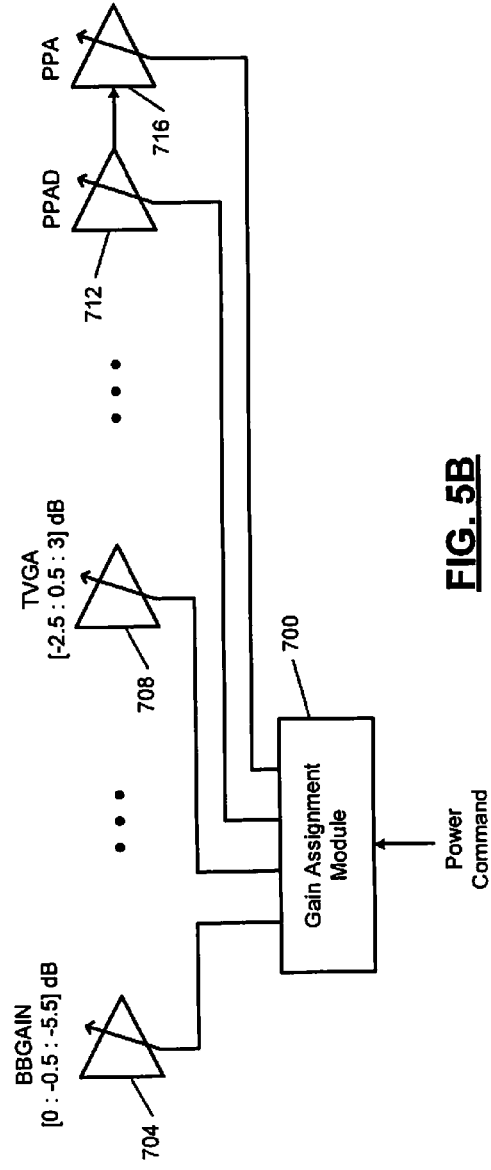
Figure 7A:
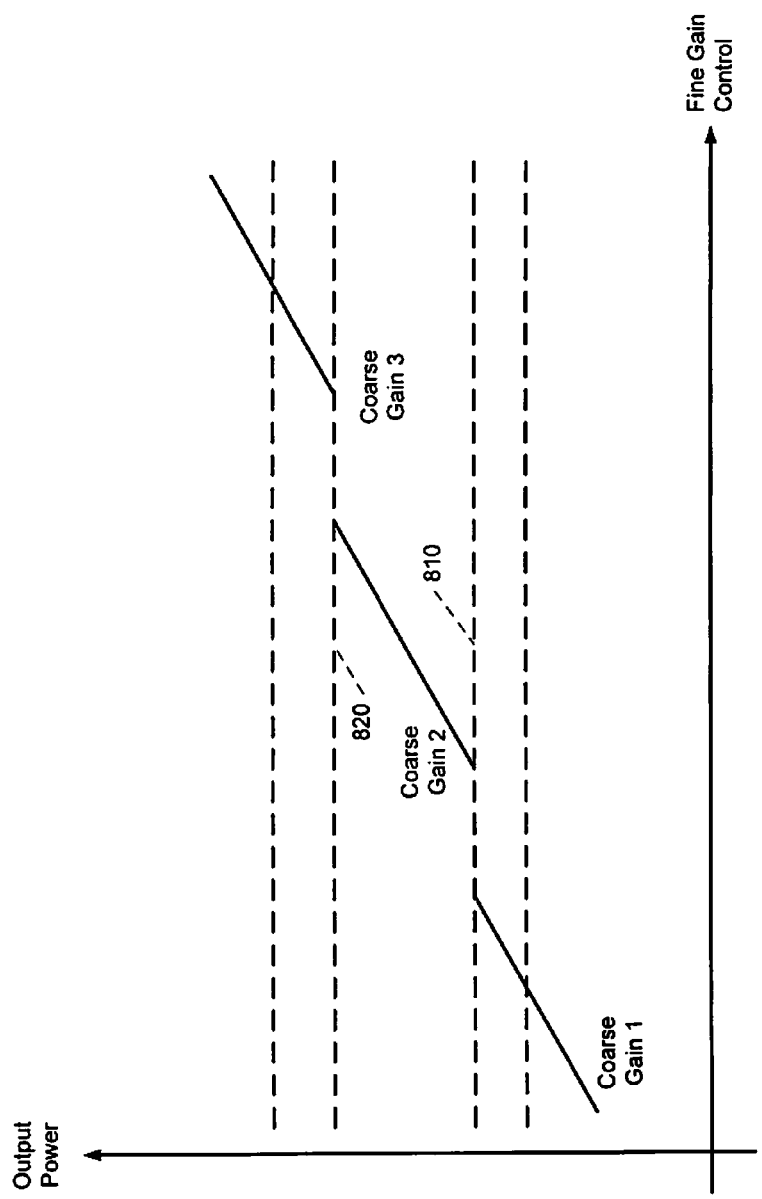
FIG. 7A is an example depiction of output power curves not using hysteresis.
Figure 7B:
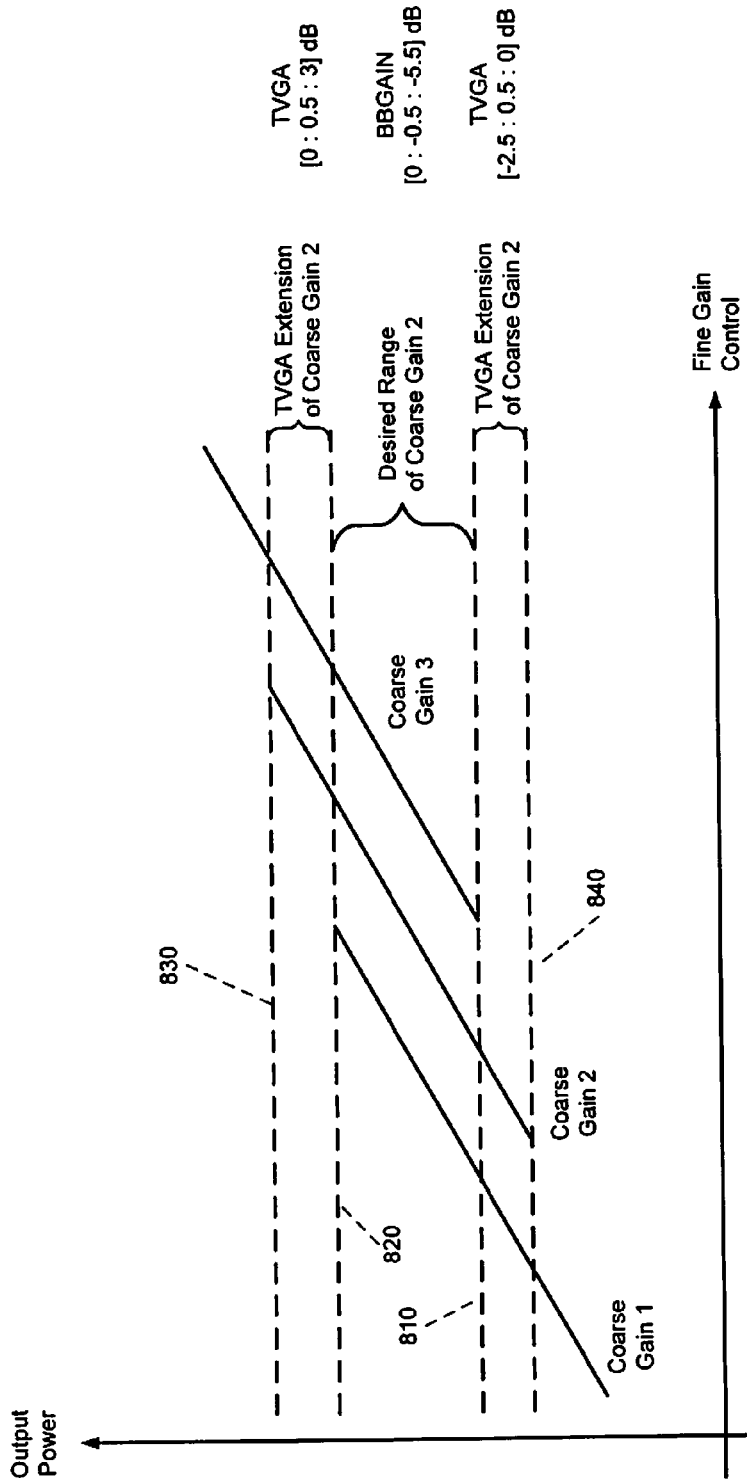
FIG. 7B is an example depiction of output power curves where hysteresis is implemented.
Figure 9:
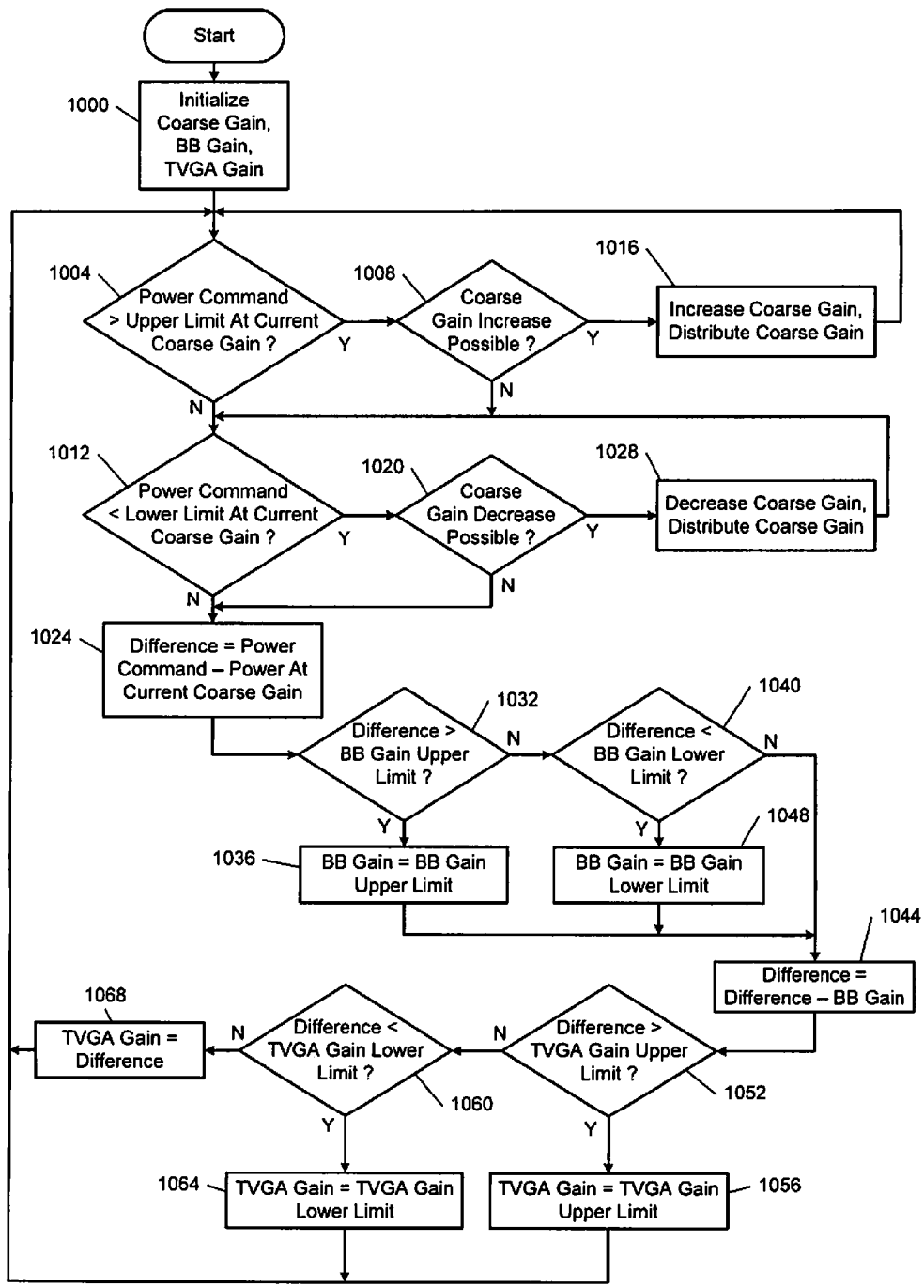
FIG. 9 is a flowchart depicting example operation of gain hysteresis according to the principles of the present disclosure.

To minimize deviations from linearity when changing gain, hysteresis is used so that small changes in gain are used in favor of large steps in gain. FIG. 4 shows a system in which gain is assigned to various gain stages to avoid large steps in gain. FIGS. 5A-5B depict control signals going to adjustable gain amplifiers. FIG. 6 is a block diagram of a gain assignment module that applies hysteresis in order to avoid coarse changes in gain. FIG. 7A depicts output power curves without hysteresis while FIG. 7B depicts output power curves using hysteresis. An example method of applying hysteresis is shown in FIG. 9.

Referring now to FIG. 2A, a baseband module 200 receives user data for wireless transmission and encodes that data using a modulation scheme. The baseband module 200 provides modulated baseband data to a baseband amplifier 204, which scales the modulated baseband data. The scaled signals are provided to a digital predistortion compensation module 208, which applies a predistortion correction based on measured transmission characteristics and provides the result to a digital-to-analog converter (DAC) 212. The predistortion correction may be defined by a set of coefficients based on differences between a measured transmit signal and a desired transmit signal.

A transmit variable gain amplifier 216 receives the analog signal from the DAC 212 and applies a variable gain. The amplified signal is received and processed by a low-pass filter 220, which provides the low-pass-filtered signal to a mixer 224. The mixer 224 up-converts the filtered signal to radio frequency and provides the up-converted signal to a programmable power amplifier driver 228. The programmable power amplifier driver 228 provides an amplified signal to a programmable power amplifier 232, which amplifies the signal and provides the further amplified signal to a power amplifier 236. The power amplifier 236 applies an additional stage of gain and drives an antenna 240 with the amplified signal.

A radio frequency attenuator 244 measures the output of the power amplifier 236, and the measured transmit signal is down-converted by a second mixer 248. A reverse baseband amplifier 252 drives an analog-to-digital converter (ADC) 256. The resulting digital value is provided to the digital predistortion compensation module 208, which adjusts the baseband signal provided to the DAC 212 to achieve the desired transmit signal.

A transmission control module 260 determines a desired power and outputs a power request. A desired power may be based on measurements of distance to a receiver, measured error rate, and/or other parameters. For example only, when an error rate increases above a threshold, the power request may be increased until the error rate falls below that threshold.

A power detector 264 measures output power of the power amplifier 236. The power detector 264 may be connected to an output of the power amplifier 236 or to an internal node of the power amplifier 236. An ADC 268 generates a detected power value based on the measurement from the power detector 264. A calibration module 272 compares the detected power to the power request and generates a calibration offset so that the actual transmit power matches the power request.

The calibration offset is added to the power request by a summing module 276. The resulting sum is referred to as a power command and is provided to one or more amplifiers. In various implementations, and as shown in FIG. 2A, the power command may be provided to the baseband amplifier 204, the transmit variable gain amplifier 216, the programmable power amplifier driver 228, and the programmable power amplifier 232.

In situations where there is a single feedback loop, the calibration module 272 may include a single calibration counter 280 that accumulates a value based on a cumulative difference between up and down signals. An up signal may be generated when the measured transmit power is above an upper threshold, while the down signal may be generated when the transmit power is below a lower threshold.

A comparator 284 compares an average transmit power value to an upper threshold (VTH) and the result of this comparison is the up signal. A comparator 288 compares the average transmit power to a low threshold (VTL) and the output is referred to as the down signal. The thresholds VTH and VTL are set based on the power request and may be, for example, a predetermined offset above and below the power request, respectively.

An average module 292 generates the average transmit power signal based on the detected power from the ADC 268. The average module 292 may be a running average and may be reset when the power request changes. In various implementations, the calibration counter 280 may also be reset when the power request changes. The calibration counter 280 may include a counter that starts at zero and increments every time an up signal is received and decrements every time a down signal is received. The up and down signals may be determined, or latched, after each sample of the ADC 268. Alternatively, the calibration counter 280 may monitor the up and down signals at a slower rate than the sampling rate of the ADC 268.

Referring now to FIG. 2B, a calibration module 300 is shown that implements multiple feedback loops and selects one of the feedback loops based on a calibration selection from the transmission control module 260. The transmission control module 260 may select one of the feedback loops based on the power request that is being sent to the summing module 276.

Referring now to FIG. 2C, a calibration module 310 is shown that receives the power request from the transmission control module 260. The calibration module 310 may then choose a feedback loop based on the power request.

Figure 3A:
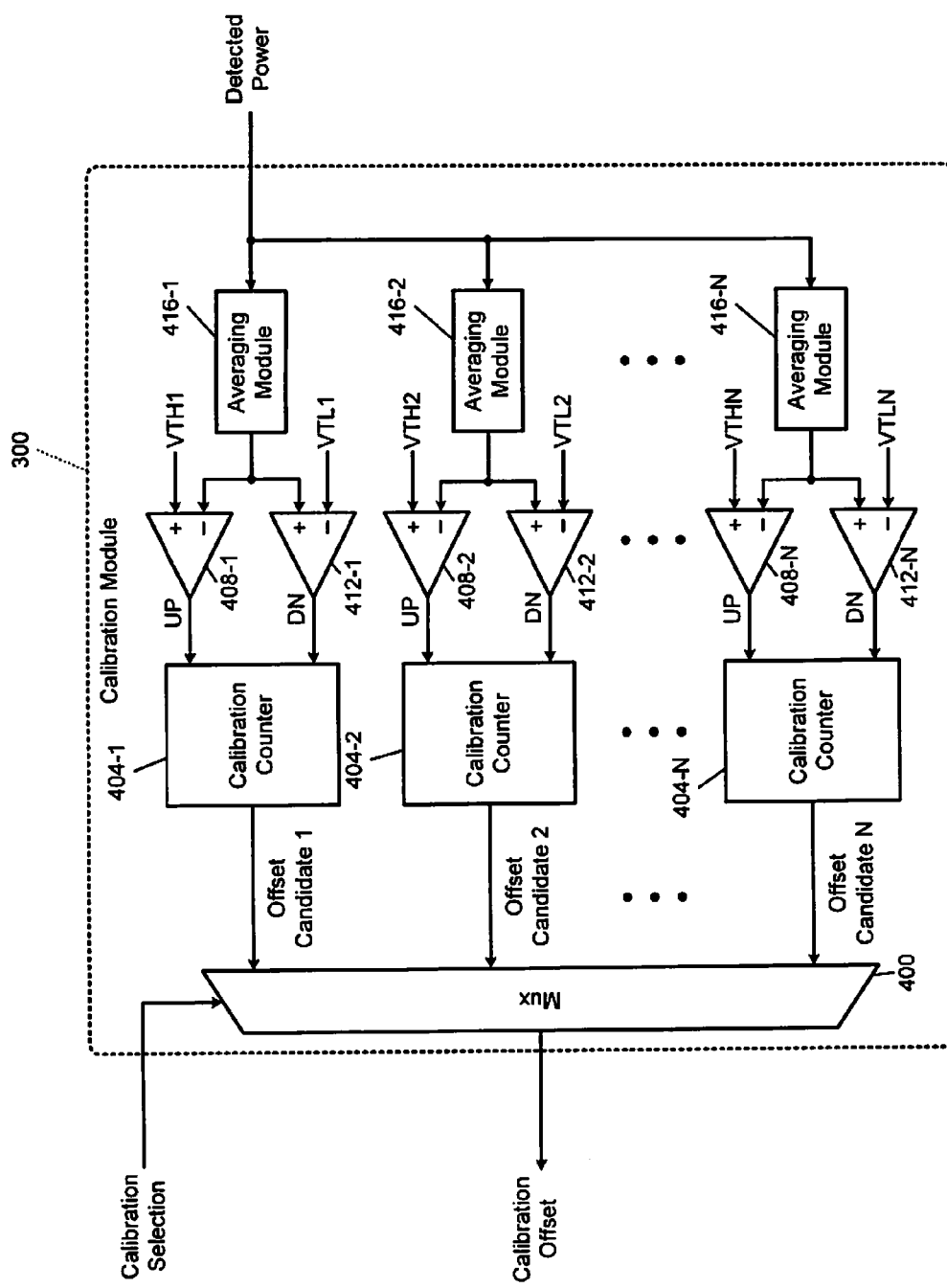

Referring now to FIG. 3A, a functional block diagram of an example implementation of the calibration module 300 is shown. A selection module, such as multiplexer 400, outputs the calibration offset to the summing module 276 based on the received calibration selection. The multiplexer 400 receives N offset candidates, where the variable N refers to the number of feedback loops.

In FIG. 3A, the first feedback loop, which generates offset candidate 1, includes calibration counter 404-1, up signal generating module 408-1, down signal generating module 412-1, and averaging module 416-1. The output of the calibration counter 404-1 is referred to as a candidate because it is a candidate for selection by the multiplexer 400 to be output as the calibration offset. The second offset candidate is generated by calibration counter 404-2, up signal generating module 408-2, down signal generating module 412-2, and averaging module 416-2. Similarly, offset candidate N is generated by calibration counter 404-N, up signal generating module 408-N, down signal generating module 412-N, and averaging module 416-N. In various implementations, the up signal generation modules 408 and the down signal generation modules 412 may be implemented as comparators.

Figure 3B:
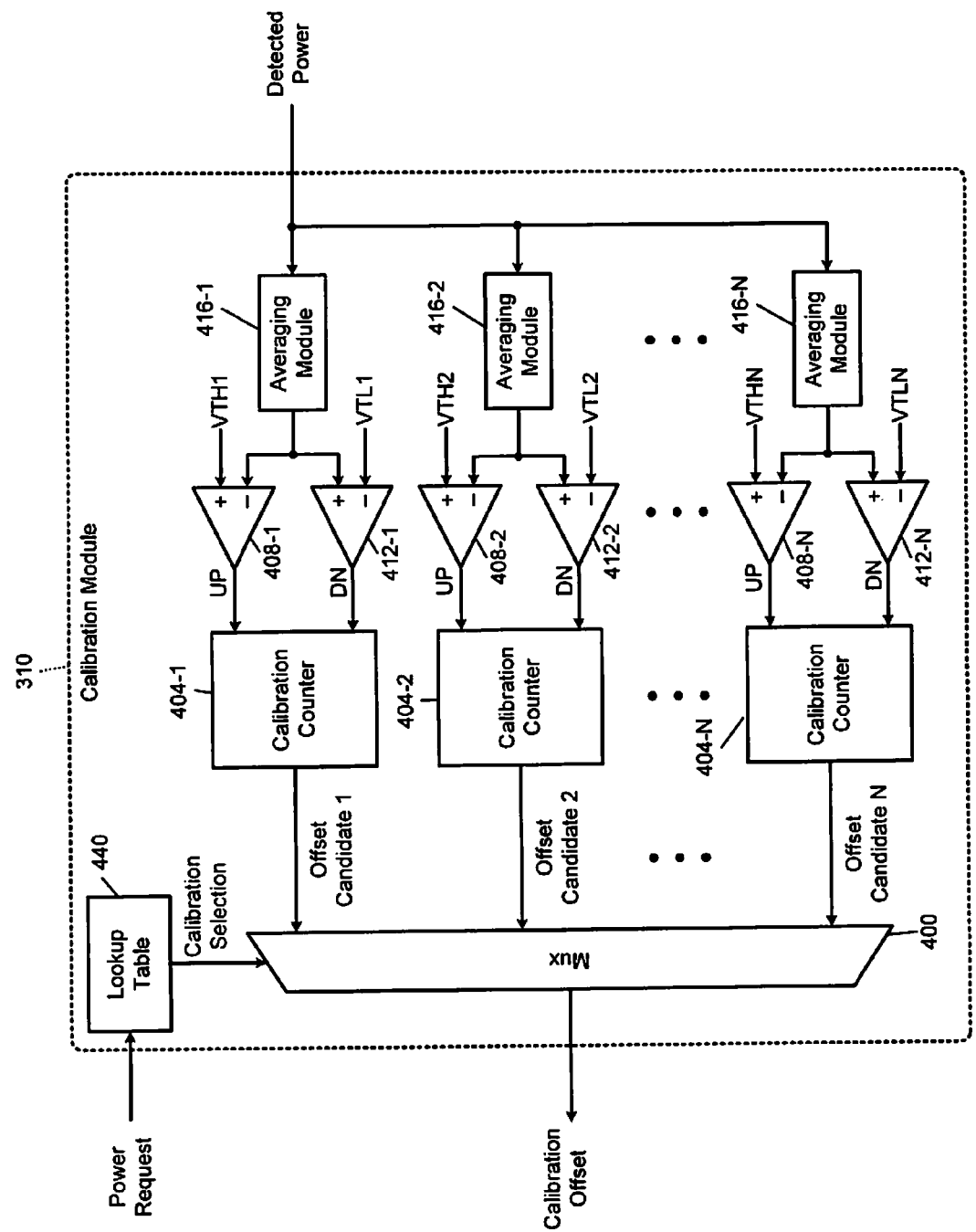

Referring now to FIG. 3B, an example implementation of a calibration module 310 is shown. The calibration module 310 includes components that may be similar to the calibration module 300 of FIG. 3A. A power request is received and converted to a calibration selection for the multiplexer 400. In various implementations, each offset candidate may be used for multiple values of the power request signal or for a range of values of the power request signal. A lookup table 440 determines within which range the power request falls and outputs an appropriate calibration selection to the multiplexer 400.

Figure 3C:
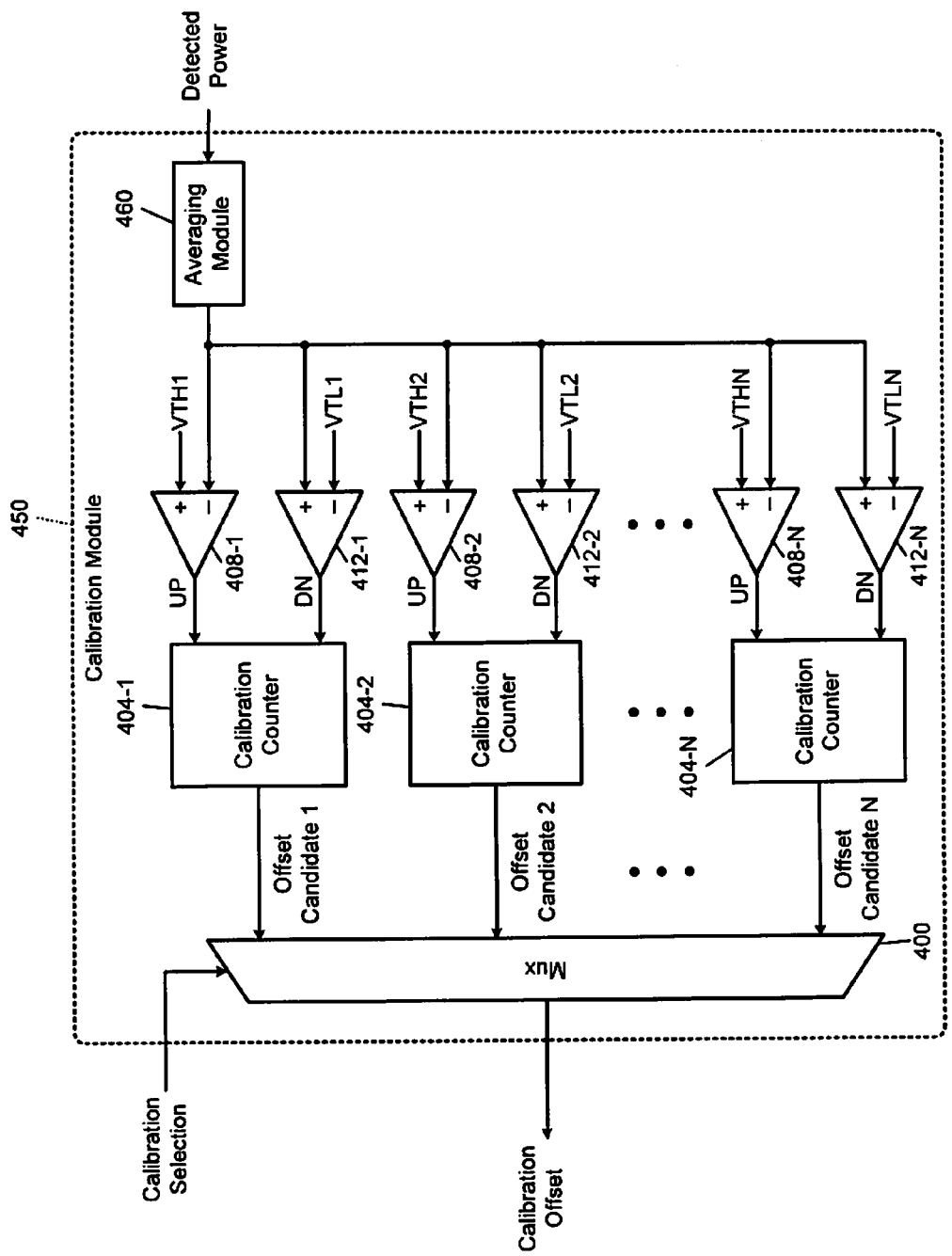

Referring now to FIG. 3C, an example calibration module 450 is shown. The calibration module 450 includes components that may be similar to the calibration module 300 of FIG. 3A. However, in the calibration module 450, a shared averaging module 460 may supply an average power value to all of the up signal generating modules 408 and the down signal generating modules 412.

Figure 3D:
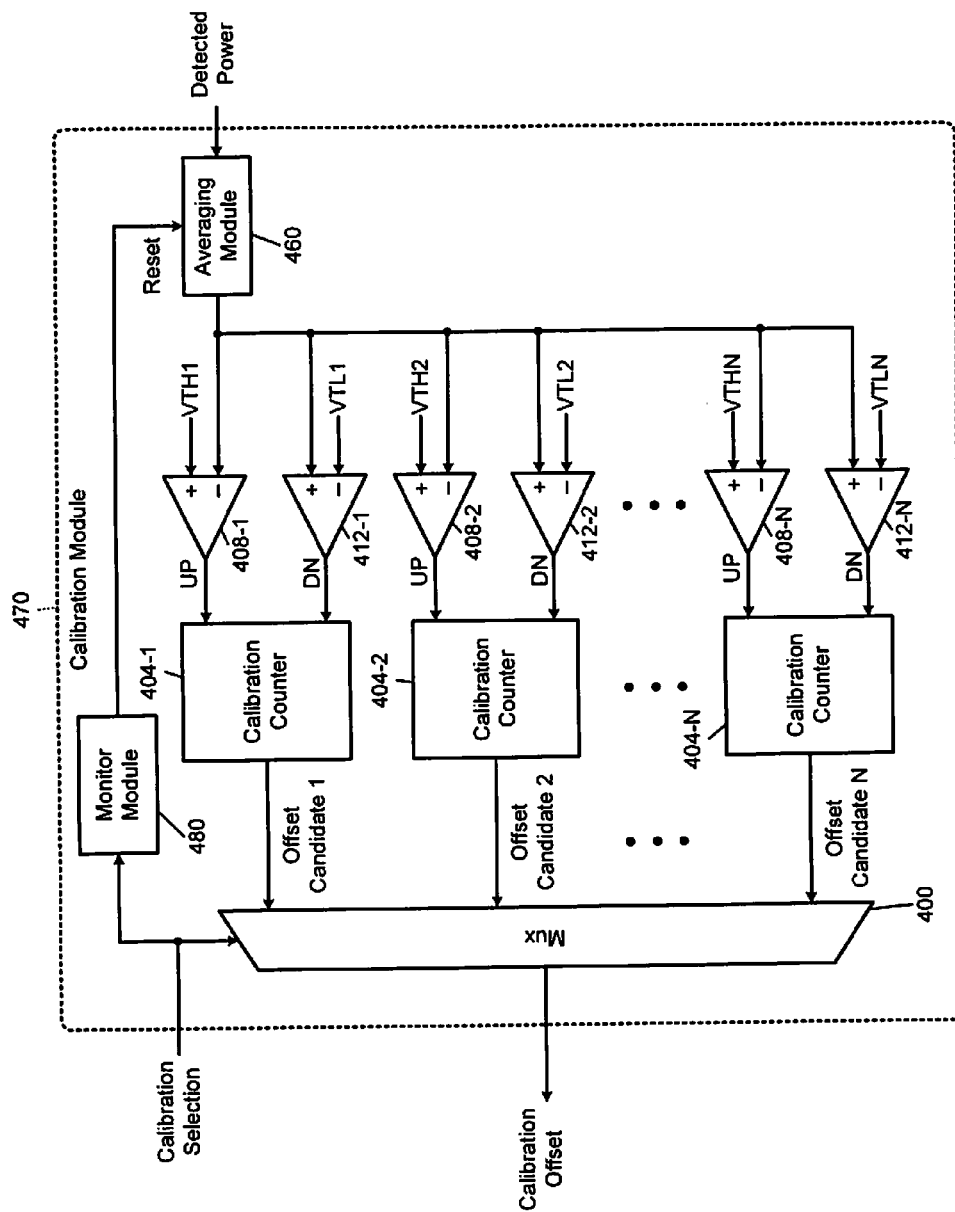

Referring now to FIG. 3D, an example calibration module 470 is shown. Components in the calibration module 470 may be similar to those of the calibration module 450 of FIG. 3C. A monitor module 480 monitors the calibration selection signal and, based on the change in the calibration selection signal, resets the averaging module 460. For example only, the averaging module 460 may be a running average, where the time constant of the average causes the average value to exhibit a delay in tracking a large change in the detected power. Therefore, the reset signal may allow the averaging module 460 to quickly jump to the new detected power signal and begin averaging from there.

Referring now to FIG. 3E, an example calibration module 500 is shown. Components in the calibration module 500 may be similar to those of the calibration module 470 of FIG. 3D. The high and low threshold values used for the up signal generating modules 408 and the down signal generating modules 412 may be generated by a threshold module 510 in response to the calibration selection.

In various implementations, a low lookup table 514 may generate a low threshold, while a high lookup table 518 generates a high threshold. The low threshold is then distributed to the down signal generating modules 412. The high threshold is distributed to the up signal generating modules 408.

Figure 3F:
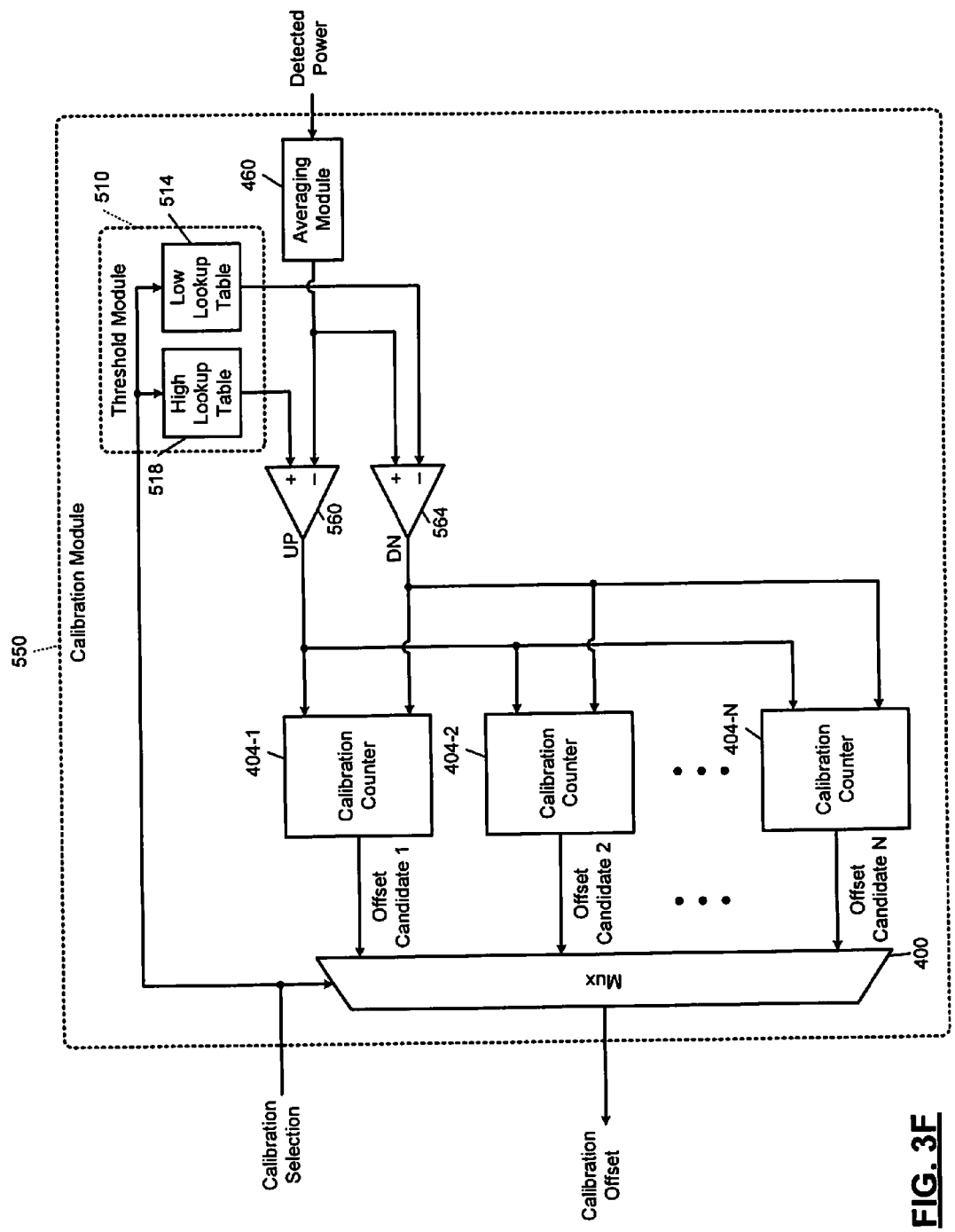

Referring now to FIG. 3F, an example calibration module 550 is shown. Components of the calibration module 550 may be similar to those of the calibration module 500 of FIG. 3E.

In the calibration module 550, a single up signal generating module 560 and signal down signal generating module 564 may be used. The up and down signals generated are distributed to each of the calibration counters 404.

Figure 3G:
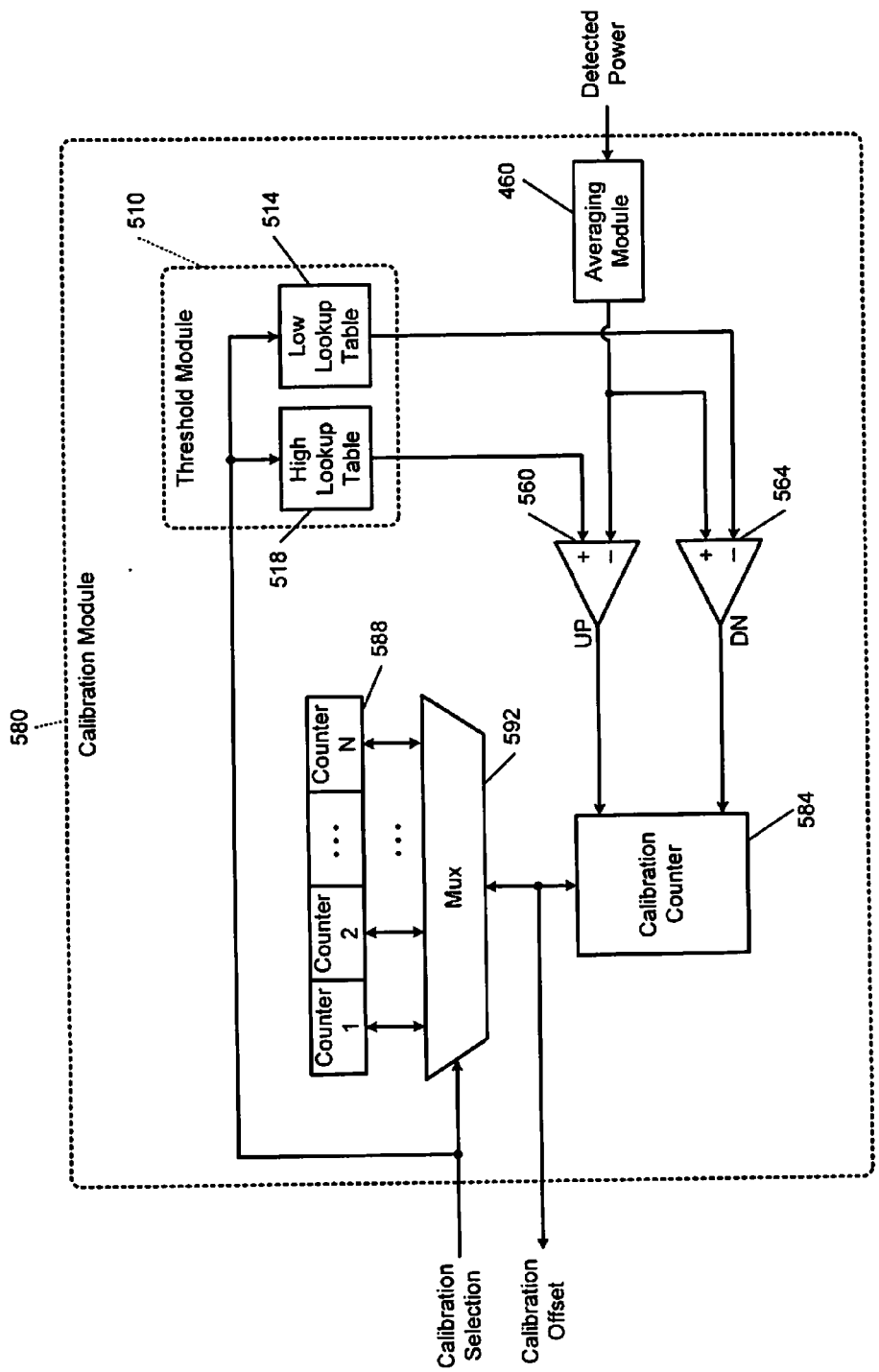

Referring now to FIG. 3G, an example calibration module 580 is shown. Components of the calibration module 580 may be similar to those of the calibration module 550 of FIG. 3F. A single calibration counter 584 receives the up and down signals from the up signal generating module 560 and the signal down signal generating module 564, respectively.

Based on the up and down signals, the calibration counter 584 updates a counter value, which may be a digital value stored in a register. To allow the calibration counter 584 to implement N feedback loops, N separate counter values are stored in a storage array 588. The storage array 588 may be implemented as registers, each composed of, for example, flip-flop circuits. The storage array 588 may alternately be implemented using another form of storage, such as random access memory.

A multiplexer 592 connects one of the elements of the storage array 588 to the calibration counter 584. The multiplexer 592 determines which of the elements to select based on the calibration selection. The selected counter value is output from the calibration module 580 as the calibration offset.

Figure 3H:
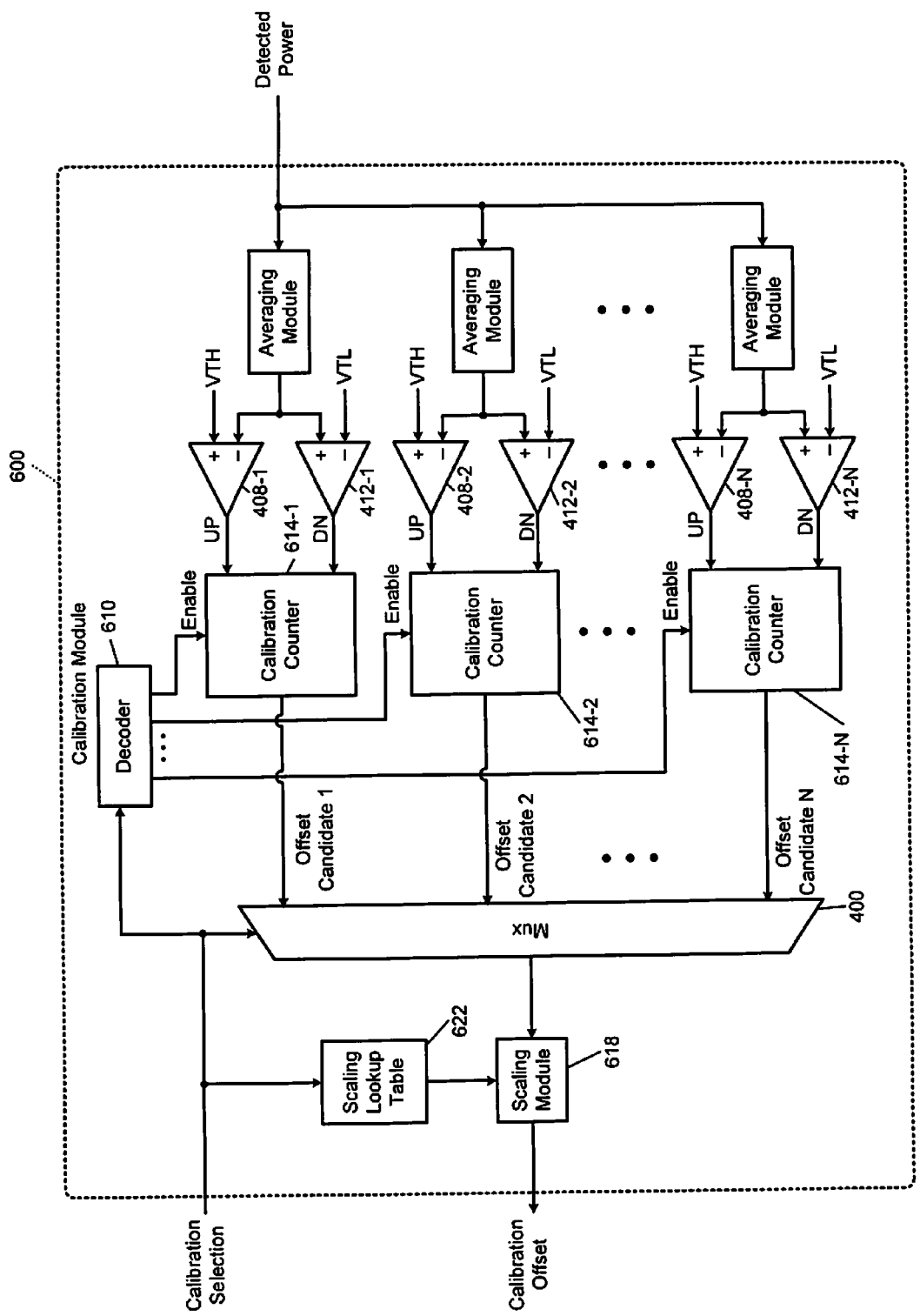

Referring now to FIG. 3H, an example calibration module 600 is shown. Components of the calibration module 600 may be similar to those of the calibration module 300 of FIG. 3A. A decoder 610 receives the calibration selection signal and selectively enables one of calibration counters 614-1, 614-2, . . . , 614-N (collectively, calibration counters 614).

The calibration counters 614 may increment and decrement in response to the up and down signals only when the corresponding enable signal is received from the decoder 610. This may prevent the calibration counters 614 from ramping up or ramping down while a different power target is being achieved. For example, the calibration counter 614-1 is disabled while the calibration counter 614-2 is operating.

The calibration module 600 also includes a scaling module 618 that scales the output of the multiplexer 400. The offset candidates from the calibration counters 614 may simply be counts of the cumulative difference between up and down signals. These counts may not be in the same units or of the same scale as the power request provided to the summing module 276. The scaling module 618 therefore applies a scaling factor and outputs the calibration offset based on this scaling.

In various implementations, the scaling factor may be a constant that adjusts the units of the calibration offset from count to, for example, dB. Alternatively, the scaling factor may change depending on the calibration selection. For example, a scaling lookup table 622 may provide a scaling factor to the scaling module 618 in response to the calibration selection.

While FIGS. 3A-3H demonstrate different approaches and functional blocks, these approaches and functional blocks may be combined with each other in various ways according to the principles of the present disclosure. For example only, the calibration module 550 of FIG. 3F may include the monitor module 480 of the calibration module 470 of FIG. 3D and the scaling module 618 and the scaling lookup table 622 of the calibration module 600 of FIG. 3H. In addition, the calibration module 550 of FIG. 3F may include the decoder 610 and the calibration counters 614 of the calibration module 600 of FIG. 3H.

Referring now to FIG. 4, an example transmit system is shown. This system is similar to that of FIG. 2B. A gain assignment module 700 receives the power command and determines which amplifiers will be used to achieve the received power command. A baseband amplifier 704 may offer fine gain adjustments. For example only, the fine gain adjustments may be in steps of 0.5 dB. As a further example, the range of the baseband amplifier 704 may be from −5.5 dB to 0 dB in steps of 0.5 dB. A transmit variable gain amplifier 708 may also allow for fine gain adjustments. As an example only, the transmit variable gain amplifier 708 may allow for amplification between −2.5 dB and 3 dB in steps of 0.5 dB.

A programmable power amplifier driver 712 may allow for coarse gain steps. For example only, the coarse gain steps may be 6 dB. A programmable power amplifier 716 may also allow for coarse gain steps. In a further example, the programmable power amplifier 716 may allow for coarse gain steps of 6 dB. In various implementations, the value of coarse gain steps in dB may be more than 10 times greater than the value of fine gain steps in dB. In other implementations, the value of coarse gain steps in dB may be more than 5 times greater than the value of fine gain steps in dB.

Referring now to FIG. 5A, an example implementation of the gain assignment module 700 provides gain instructions to the baseband amplifier 704, the transmit variable gain amplifier 708, the programmable power amplifier driver 712, and the programmable power amplifier 716. For example only, the gain assignment module 700 may output a single digital value, which is interpreted by the baseband amplifier 704, the transmit variable gain amplifier 708, the programmable power amplifier driver 712, and the programmable power amplifier 716 to determine the desired gain for each.

Referring now to FIG. 5B, another implementation of the gain assignment module 700 may provide individual control signals to the baseband amplifier 704, the transmit variable gain amplifier 708, the programmable power amplifier driver 712, and the programmable power amplifier 716. In this way, the desired gains, or values specifying those gains, can be directly provided to each amplifier.

Referring now to FIG. 6, an example implementation of the gain assignment module 700 is shown. A hysteresis module 750 receives the power command and determines the coarse gain and fine gain values that will be used to achieve the power command. The coarse gain value is provided to a coarse assignment module 754, while the fine gain value is assigned to a fine assignment module 758.

For example only, the programmable power amplifier driver 712 and the programmable power amplifier 716 allow for coarse gain adjustment, while the baseband amplifier 704 and the transmit variable gain amplifier 708 allow for fine gain adjustment. Therefore, the fine assignment module 758 provides fine gain control signals to the baseband amplifier 704 and the transmit variable gain amplifier 708. Meanwhile, the coarse assignment module 754 provides coarse gain control signals to the programmable power amplifier driver 712 and the programmable power amplifier 716.

In various implementations, the coarse assignment module 754 may be implemented using a lookup table 762, which generates the coarse control signals based on the coarse gain value. In addition, the fine assignment module 758 may include a lookup table 766, which generates the fine control signals based on the fine gain value the hysteresis module 750.

Referring now to FIG. 7A, example gain curves are shown for three coarse gain values. Output power is shown on the y-axis, while the x-axis is related to the fine gain control signal. Although shown as straight lines, the coarse gain curves may actually be stair steps because the fine gain increments are discrete, not continuous. When looking at coarse gain 2, which represents the range of output powers that can be achieved without changing the coarse gain value, the output power that can be achieved is defined by thresholds 810 and 820.

Once the desired output power increases above the threshold 820, a different coarse gain value, in this example coarse gain 3, will be chosen. Similarly, when the desired output power falls below threshold 810, the coarse gain 1 value of coarse gain will be chosen. At these transitions between coarse gain values, the adaptive power amplifier linearization may no longer be correctly compensating for transmit nonlinearity. As the adaptive power amplifier linearization recovers to track the new amplifier characteristic at the new coarse gain setting, the output of the power amplifier is less linear than desired.

Referring now to FIG. 7B, coarse gain curves where hysteresis is used are shown. In FIG. 7B, assuming that coarse gain 2 is the current coarse gain value, when the requested output power increases above the threshold 820, the coarse gain 2 value can continue to be used until a further threshold 830 is reached. Similarly, when using coarse gain 2 and the desired output power decreases below the threshold 810, coarse gain 2 can continue to be used until further threshold 840 is reached. If the desired output power reaches below the threshold 840, coarse gain 1 is selected.

Then, as the desired output power increases, coarse gain 1 continues to be used until the desired output power exceeds the threshold 820. At this point, a higher coarse gain value is used. In various implementations, the next coarse gain (in this case, coarse gain 2) is used. Alternatively, multiple coarse gain steps may be used in anticipation of further increases of output power. In such implementations, control may change from coarse gain 1 to, for example, coarse gain 3 when threshold 820 is reached.

For coarse gain 2, a middle range of the achievable output power (between thresholds 810 and 820) is provided by fine adjustments of, for example, the baseband amplifier. By using further fine adjustments provided by another source, such as the transmit variable gain amplifier, further extension of the coarse gain 2 range can be achieved above threshold 820 as well as below threshold 810. As an example only, transmit variable gain amplifier may allow for an extra 3 dB of extension to the coarse gain curve above threshold 820 and 2.5 dB of extension below threshold 810.

Referring now to FIG. 8, a flowchart depicts example operation of calibration modules such as are shown in FIGS. 3A-3H. Control begins at 900, where an initial power request is determined. Control continues at 904, where control identifies a range corresponding to the current power request. Control continues at 908, where control selects an offset candidate as the calibration offset based on the range identified at 904.

Control continues at 912, where counting is paused for calibration counters not providing the selected offset candidate. Dashed lines indicate that 912 may be omitted or may be inapplicable given a selected hardware implementation. For example only, counting at 912 may not be paused when there is only one calibration counter, such as is shown in FIG. 3G. Control continues at 916, where averaging is paused for offset candidates that are not selected. In various implementations, 916 also may be omitted. For example, averaging will not be paused when only a single averaging module is present, such as is shown in FIG. 3C.

Control continues at 920, where an up/down count is maintained for the selected candidate. For example, when an up signal is generated, the count is incremented, while when a down signal is generated, the count is decremented. Control continues at 924. If the power request changes, control transfers to 928; otherwise, control returns to 920. At 928, the average is reset and control returns to 904. In various implementations, 928 may be omitted.

Referring now to FIG. 9, an example implementation of hysteresis is described. Control begins at 1000, where coarse gain, baseband gain, and transmit variable gain amplifier gains are initialized. Although the baseband gain and transmit variable gain amplifier gains are used in FIG. 9 as the fine gains, the present disclosure applies equally to other arrangements and combinations of coarse and fine gain adjustments across various amplifiers. Further, a single amplifier may provide both coarse and fine gain adjustments.

Control continues at 1004, where control determines whether the power command is greater than the upper power limit achievable at the current coarse gain. In other words, control determines whether, for the current coarse gain, fine gain adjustments can achieve the power command. If so, control transfers to 1008; otherwise, control transfers to 1012. At 1008, control determines whether a coarse gain increase is possible. If so, control transfers to 1016, where control increases the coarse gain and distributes the coarse gain. In other words, control determines how much gain is provided by each of the amplifiers offering coarse gain control. Control then returns to 1004.

When the coarse gain increase is not possible at 1008, control cannot increase the coarse gain any further and so control continues at 1012. In various implementations, an error may be signaled when the power command is not achievable. At 1012, control determines whether the power command is less than the lower the lower limit achievable at the current coarse gain. If so, control transfers to 1020; otherwise, control transfers to 1024.

At 1020, control determines whether a coarse gain decrease is possible. If so, control transfers to 1028; otherwise, control is not able to change coarse gain and control continues at 1024. At 1028, control decreases the coarse gain and distributes the coarse gain. Again, the coarse gain is distributed among amplifiers that allow for coarse gain adjustments. When coarse gain is increased or decreased at 1016 or 1028, a single coarse gain step may be used or multiple coarse gain steps may be used. After 1028, control returns to 1012 to determine whether further coarse gain decreases are desired.

At 1024, control sets a variable, Difference, to the difference between the power command and the power provided by the current coarse gain. Control continues at 1032, where control determines whether Difference is greater than an upper limit of one of the fine gain amplifiers. In this example, the fine gain amplifier is the baseband amplifier. If Difference is greater than the upper limit, control transfers to 1036; otherwise, control transfers to 1040.

At 1036, the baseband gain is set to its upper limit and control continues at 1044. In other words, control first uses the full adjustment of baseband gain to achieve the power command. If baseband gain cannot eliminate the difference, additional fine gain is used below. At 1040, control determines whether Difference is less than the lower limit of baseband gain, if so, control transfers to 1048; otherwise, control transfers to 1044. At 1048, the baseband gain is set to its lower limit and control continues at 1044.

At 1044, control reduces Difference by the value of baseband gain. The remaining value of Difference is then achieved using a further fine gain amplifier—in this example, the transmit variable gain amplifier. Control continues at 1052, where control determines whether Difference is greater than a transmit variable gain amplifier upper limit. If so, control transfers to 1056; otherwise, control transfers to 1060. At 1056, control sets the transmit variable gain amplifier gain to its upper limit and returns to 1004.

At 1060, control determines whether Difference is less than the lower limit of the transmit variable gain amplifier. If so, control transfers to 1064; otherwise, control transfers to 1068. At 1064, control sets the gain of the transmit variable gain amplifier to its lower limit and returns to 1004. If control reaches either 1056 or 1064, the power command is not being achieved because the transmit variable gain amplifier is not able to finish reducing the difference between the current power and the power command. An error may therefore be signaled. At 1068, the transmit variable gain amplifier is able to eliminate the difference and is set equal to Difference. Control then returns to 1004.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A radio frequency transmitting system comprising:
a programmable amplifier configured to amplify an input signal to generate an amplified signal;
a power amplifier configured to output a transmit signal in response to the amplified signal, wherein the transmit signal has a transmit power;

a power detector configured to generate a power measurement in response to the transmit power;
a calibration module configured to implement a plurality of feedback loops to adjust a gain of the programmable amplifier in response to a difference between the power measurement and a desired transmit power, wherein the calibration module is configured to select one of the plurality of feedback loops in response to the desired transmit power; and
a summing module configured to generate a power command in response to the desired transmit power and an offset, wherein the calibration module generates the offset, and wherein the gain of the programmable amplifier is adjusted in response to the power command,
wherein the calibration module comprises
  a plurality of counters, wherein each of the plurality of counters is configured to track a difference between up signals and down signals, wherein the up signals and the down signals are generated based on the power measurement, and
  a selection module configured to select one of the plurality of counters in response to the desired transmit power, wherein the offset is based on the selected one of the plurality of counters.

2. The system of claim 1, further comprising a plurality of programmable amplifiers, wherein the plurality of programmable amplifiers includes the programmable amplifier, wherein the plurality of programmable amplifiers are arranged in series to generate the amplified signal, and wherein the calibration module adjusts gains of the plurality of programmable amplifiers in response to the difference.

3. The system of claim 1, further comprising a plurality of programmable amplifiers, wherein the plurality of programmable amplifiers includes the programmable amplifier, and wherein respective gains of the plurality of programmable amplifiers are adjusted in response to the power command.

4. The system of claim 3, further comprising a gain distribution module configured to make one of coarse gain adjustments and fine gain adjustments to the respective gains of the plurality of programmable amplifiers.

5. The system of claim 4, wherein a decibel value of each of the coarse gain adjustments is at least 5 times greater than a decibel value of each of the fine gain adjustments.

6. The system of claim 4, wherein:
for a first desired transmit power, the gain distribution module is configured to choose one of (i) a first coarse gain and a first fine gain, and (ii) a second coarse gain and a second fine gain;
the first coarse gain is different than the second coarse gain; and
the gain distribution module is configured to choose the first coarse gain and the first fine gain in response to the first coarse gain matching a present coarse gain.

7. The system of claim 1, further comprising:
an up signal generating module configured to selectively generate one of the up signals in response to a comparison of the power measurement and a first predetermined threshold; and
a down signal generating module configured to selectively generate one of the down signals in response to a comparison of the power measurement and a second predetermined threshold,
wherein a first counter of the plurality of counters is configured to maintain a count based on a difference between (i) a number of the up signals generated by the up signal generating module and (ii) a number of the down signals generated by the down signal generating module.

8. A radio frequency transmitting system comprising:
a programmable amplifier configured to amplify an input signal to generate an amplified signal;
a power amplifier configured to output a transmit signal in response to the amplified signal, wherein the transmit signal has a transmit power;
a power detector configured to generate a power measurement in response to the transmit power;
a calibration module configured to implement a plurality of feedback loops to adjust a gain of the programmable amplifier in response to a difference between the power measurement and a desired transmit power, wherein the calibration module is configured to select one of the plurality of feedback loops in response to the desired transmit power; and
a summing module configured to generate a power command in response to the desired transmit power and an offset, wherein the calibration module generates the offset, and wherein the gain of the programmable amplifier is adjusted in response to the power command,
wherein the calibration module comprises
  a plurality of count registers each configured to store a count;
  a selection module configured to select one of the plurality of count registers in response to the desired transmit power, wherein the offset is based on the count of the selected one of the plurality of count registers; and
  a counter configured to adjust the selected one of the plurality of count registers in response to a difference between up signals and down signals, wherein the up signals and the down signals are generated based on the power measurement.

9. A method of operating a radio frequency transmitting system, the method comprising:
using a programmable amplifier, amplifying an input signal to generate an amplified signal;
using a power amplifier, outputting a transmit signal in response to the amplified signal, wherein the transmit signal has a transmit power;
generating a power measurement in response to the transmit power;
implementing a plurality of feedback loops to adjust a gain of the programmable amplifier in response to a difference between the power measurement and a desired transmit power;
selecting one of the plurality of feedback loops in response to the desired transmit power;
generating an offset based on the selected one of the plurality of feedback loops;
generating a power command in response to a sum of the desired transmit power and the offset;
adjusting the gain of the programmable amplifier in response to the power command;
generating up signals and down signals based on the power measurement;
using a plurality of counters, tracking differences between the up signals and down signals;
selecting one of the plurality of counters in response to the desired transmit power; and
generating the offset based on the selected one of the plurality of counters.

10. The method of claim 9, further comprising adjusting gains of a plurality of programmable amplifiers in response to the difference, wherein the plurality of programmable amplifiers includes the programmable amplifier and are arranged in series to generate the amplified signal.

11. The method of claim 9, further comprising adjusting respective gains of a plurality of programmable amplifiers in response to the power command, wherein the plurality of programmable amplifiers includes the programmable amplifier.

12. The method of claim 11, further comprising making, for each of the respective gains of the plurality of programmable amplifiers, one of a coarse gain adjustment and a fine gain adjustment.

13. The method of claim 12, wherein a decibel value of each of the coarse gain adjustments is at least 5 times greater than a decibel value of each of the fine gain adjustments.

14. The method of claim 12, further comprising, for a first desired transmit power, choosing one of (i) a first coarse gain and a first fine gain, and (ii) a second coarse gain and a second fine gain, wherein the first coarse gain is different than the second coarse gain, and wherein the first coarse gain and the first fine gain are chosen when the first coarse gain matches a present coarse gain.

15. The method of claim 9, further comprising:
  selectively generating one of the up signals in response to a comparison of the power measurement and a first predetermined threshold;
  selectively generating one of the down signals in response to a comparison of the power measurement and a second predetermined threshold; and
  using a first one of the plurality of counters, tracking a difference between (i) a number of the up signals generated in response to the first predetermined threshold and (ii) a number of the down signals generated in response to the second predetermined threshold.

16. A method of operating a radio frequency transmitting system, the method comprising:
  using a programmable amplifier, amplifying an input signal to generate an amplified signal;
  using a power amplifier, outputting a transmit signal in response to the amplified signal, wherein the transmit signal has a transmit power;
  generating a power measurement in response to the transmit power;
  implementing a plurality of feedback loops to adjust a gain of the programmable amplifier in response to a difference between the power measurement and a desired transmit power;
  selecting one of the plurality of feedback loops in response to the desired transmit power;
  generating an offset based on the selected one of the plurality of feedback loops;
  generating a power command in response to a sum of the desired transmit power and the offset;
  adjusting the gain of the programmable amplifier in response to the power command;
  storing a plurality of counts;
  selecting one of the plurality of counts in response to the desired transmit power;
  generating the offset based on the selected one of the plurality of counts;
  generating up signals and down signals based on the power measurement; and
  adjusting the selected one of the plurality of counts in response to a difference between the up signals and the down signals.

\* \* \* \* \*